(12) United States Patent
Roose

(10) Patent No.: US 7,044,704 B1
(45) Date of Patent: May 16, 2006

(54) PORTABLE LOAD LIFTING BED

(75) Inventor: Gerald L. Roose, Pella, IA (US)

(73) Assignee: Roose Manufacturing Co., Pella, IA (US)

(*) Notice: Subject to any disclaimer, the term of this patent is extended or adjusted under 35 U.S.C. 154(b) by 60 days.

(21) Appl. No.: 10/377,839

(22) Filed: Mar. 3, 2003

(51) Int. Cl.
*B60P 1/02* (2006.01)

(52) U.S. Cl. .................................. 414/471; 280/43.23
(58) Field of Classification Search .............. 182/2.11, 182/2.9; 280/43.23; 414/471
See application file for complete search history.

(56) References Cited

U.S. PATENT DOCUMENTS

| | | | | | |
|---|---|---|---|---|---|
| 1,037,312 | A | * | 9/1912 | Primm | 254/5 C |
| 2,471,364 | A | * | 5/1949 | Weber | 414/696 |
| 2,487,508 | A | * | 11/1949 | Anderson | 254/2 R |
| 2,952,370 | A | * | 9/1960 | Long | 414/26 |
| 3,176,794 | A | * | 4/1965 | Evans et al. | 182/17 |
| 3,268,236 | A | * | 8/1966 | Stevens | 280/43.23 |
| 3,559,386 | A | * | 2/1971 | Popov et al. | 56/331 |
| 3,861,547 | A | * | 1/1975 | Sink, Sr. | 414/648 |
| 4,147,263 | A | * | 4/1979 | Frederick et al. | 414/718 |
| 4,232,627 | A | * | 11/1980 | Glenn et al. | 440/61 R |
| 4,460,064 | A | * | 7/1984 | Lutz et al. | 187/222 |
| 4,505,632 | A | * | 3/1985 | Quenzi | 414/510 |
| 4,673,328 | A | * | 6/1987 | Shiels | 414/471 |
| 4,752,177 | A | * | 6/1988 | Zenna | 414/495 |
| 4,856,314 | A | * | 8/1989 | Zurru et al. | 72/263 |
| 5,362,225 | A | * | 11/1994 | Kitano et al. | 425/472 |
| 5,489,181 | A | * | 2/1996 | Greaves | 414/398 |
| 5,513,943 | A | * | 5/1996 | Lugash et al. | 414/545 |
| 5,820,149 | A | * | 10/1998 | Sobina | 280/124.128 |
| 5,951,233 | A | * | 9/1999 | Boucher et al. | 414/495 |
| 5,992,186 | A | * | 11/1999 | Fesmire et al. | 68/210 |
| 6,273,435 | B1 | | 8/2001 | Stringer | |
| 6,457,511 | B1 | * | 10/2002 | Hackman et al. | 164/324 |
| 6,474,928 | B1 | * | 11/2002 | Christenson | 414/408 |

* cited by examiner

*Primary Examiner*—Thomas J. Brahan
(74) *Attorney, Agent, or Firm*—McKee, Voorhees & Sease, P.L.C.

(57) ABSTRACT

The invention relates to a portable load lifting bed including a base frame and a bed frame moveably mounted for movement between an upper position and a lower position. A plurality of guides connect the bed to the base frame and at least one actuator provides force for moving the bed frame between the upper position and the lower position.

2 Claims, 5 Drawing Sheets

PORTABLE LOAD LIFTING BED

BACKGROUND OF THE INVENTION

The present invention relates generally to a portable lifting bed for hauling cargo that is moveable between an upper position and a lower position.

U.S. Pat. No. 6,273,435 shows a trailer with a non-tilting movable bed. This trailer includes a hydraulic cylinder which is connected to a linkage between a base frame and a bed frame. Extension of the hydraulic cylinder causes the linkage to articulate and causes movement of the bed frame relative to the base frame. The bed frame is guided in a series of tracks between an elevated position and a lowered position.

The device of U.S. Pat. No. 6,273,435 has the disadvantage of requiring a complicated mechanical linkage between the hydraulic cylinder and the bed frame and the base frame. Furthermore, the hydraulic cylinder rises and lowers in unison with the bed frame, rather than being stationary relative to the base frame.

Therefore a primary objective of the present invention is to provide a portable lifting bed with a moveable bed that lowers to the ground for easy loading.

A further objective of the present invention is to provide a portable lifting bed that is suitable for use with a pull type trailer or a self-powered vehicle.

A further objective of the present invention is to provide a portable lifting bed which can be moved from an upper position to a lower position without tilting for easy loading and unloading of contents.

A still further object of the present invention is to provide a portable lifting bed having a new, safe design.

A still further objective of the present invention is to provide a portable lifting bed which has extensible lifters extending parallel to the direction of movement of the bed.

A still further objective of the present invention is to provide a portable lifting bed which is easy to use and economical to manufacture.

The means and method of accomplishing these and other objectives will become apparent in the following description of the invention.

BRIEF SUMMARY OF THE INVENTION

The foregoing objects may be achieved by a portable lifting bed supported on a supporting surface. The lifting bed comprises a base frame supported on the supporting surface. It includes a bed frame having an upwardly presented bed surface. At least two mounting mechanisms engage both the base frame and the bed frame and guide the bed frame for movement from an elevated position wherein the bed surface is elevated above the supporting surface to a lowered position wherein the bed surface is closely adjacent the supporting surface. An actuator includes a first elongated actuator member that is mounted to a second elongated actuator member for longitudinal extensible movement with respect to the second actuator member. The first actuator member is attached to the base frame and the second actuator member is attached to the bed frame for causing movement of the bed frame between its elevated and lowered positions.

According to one feature of the invention the two mounting mechanisms each comprise an elongated track on one of the bed frame and the base frame and a track follower guided in the track and connected to the other of the base frame and the bed frame.

According to another feature of the present invention the elongated tracks each extend from an upper track end in an inclined downward and horizontal direction to a lower track end.

According to another feature of the present invention the first and second actuator members include longitudinal first and second actuator member axes respectively. Those two actuator axes extend in a direction approximately parallel to the elongated tracks.

According to another feature of the present invention the bed frame and the base frame each include a forward end, a rear end, and opposite sides. The first actuator member always is positioned between the forward and rear ends of the base frame and the second actuator member is always positioned between the forward and rear ends of the bed frame throughout movement of the bed frame between the elevated and lowered positions.

According to another feature of the present invention, one of the first and second actuator members is a cylinder and the other is a piston and rod assembly that is longitudinally extensible and retractable with respect to the cylinder.

DETAILED DESCRIPTION OF THE PREFERRED EMBODIMENT

Figure 1:
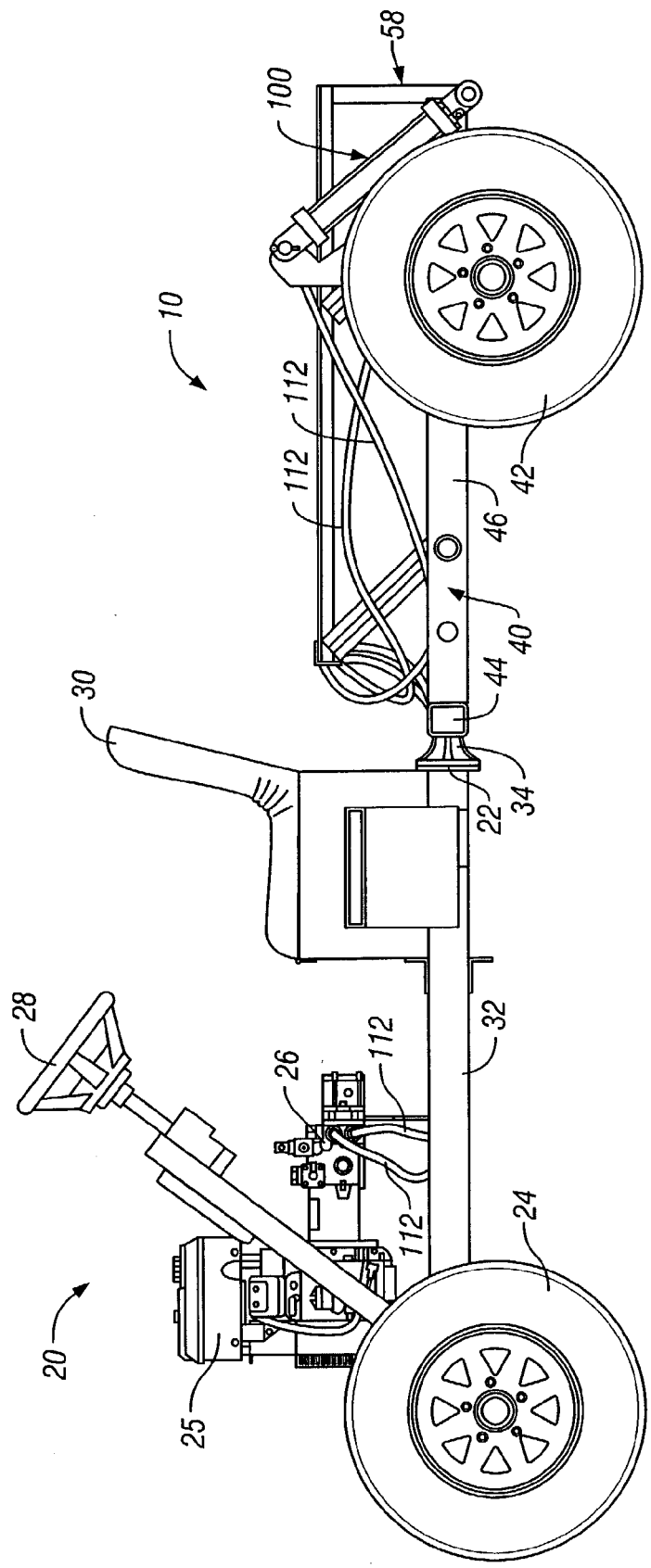
FIG. 1 is a side view of the portable lifting bed attached to a self-powered vehicle.

Referring to the drawings, numeral 10 generally refers to the portable lifting bed.

As seen in FIG. 1, the portable lifting bed 10 may be attached to a self-powered vehicle 20 by a swivel hitch 22 and a tow bar 34. The self-powered vehicle has wheels 24 supporting the self-powered vehicle 20 and the moveable bed trailer 10 a distance from the ground.

The self-powered vehicle 20 has an engine 25 that powers a lifting system or hydraulic system 26. The engine 25 also powers the movement of the self-powered vehicle 20.

The self-powered vehicle 20 is steered by a steering wheel 28.

The self-powered vehicle 20 has seats 30 displaced from the steering wheel 28 for easy access by the driver to the lifting system 26 and the steering wheel 28.

The self-powered vehicle also has a vehicle frame member 32. As seen in FIG. 1, the vehicle frame member 32 is in alignment with the moveable bed trailer base frame 40. In this configuration, the self-powered vehicle joins with the moveable bed trailer base frame. This provides structural integrity between the trailer and the moveable bed trailer wheels 42.

Although FIG. 1 as shown has a self-powered vehicle 20 on which is mounted the portable lifting bed 10, it is to be understood that the portable lifting bed 10 may be manufactured as a pull-type trailer having the same inventive features as herein disclosed.

Figures 2, 2A:
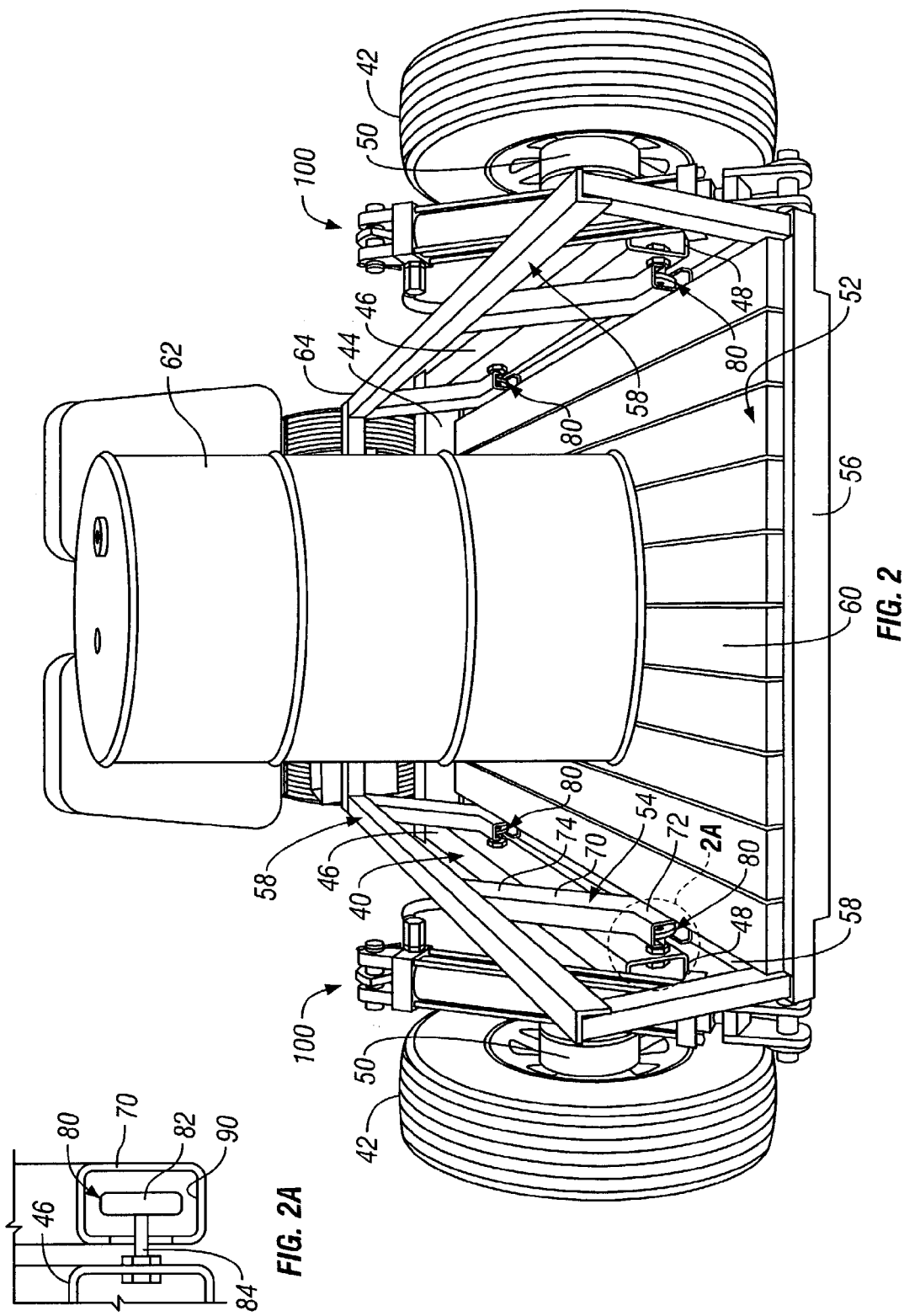
FIG. 2 is a rear view of a portable lifting bed attached to a self-powered vehicle.
FIG. 2A is an enlarged sectional view of the guide track with a roller assembly within.

As seen in FIGS. 1 and 2, the portable lifting bed 10 has a base frame 40. The base frame 40 has a forward cross member 44 and first and second longitudinal frame members or side members 46 extending in opposed relationship from the lateral frame member 44. The tow bar 34 is approximately centered upon the lateral frame member 44 and attaches to the self-powered vehicle by a swivel hitch 22 that permits pivoting about a horizontal longitudinal axis of frame 40. The base frame 40 has a back end 48 opposite the lateral frame member 44. The base frame 40 has axles 50 upon which the wheels 42 attach.

A moveable bed frame 52 moves relative the moveable bed trailer base frame 40. The bed frame 52 is mounted to the base frame 40 by a diagonal guide 54. Also interconnecting the bed 52 and the base frame 40 are two actuators 100. Actuators 100 are preferably hydraulic cylinders, but other power systems such as pneumatics or gear driven mechanisms may be used to move the bed frame 52 between an elevated position (FIG. 3) and a lowered position (FIG. 4).

The guide has an elongated guide track 70 and a track follower 80. In the preferred embodiment, the guide track 70 is an elongated angle member and the track follower 80 is a roller assembly. The guide track 70 is fixed to the bed frame 52 and the track follower 80 is mounted on the base frame 40.

The bed frame 52 has front and rear cross members 56 and longitudinal frame members or side members 58. Bed frame 52 also includes upstanding side frames 58 on opposite sides thereof. The guide tracks 70 form a part of the side frames 58.

Bed frame 52 also includes an upwardly facing bed surface 60 made of planks running longitudinally along with the bed longitudinal frame members 58. Alternatively, the bed surface 60 may be a sheet of steel as seen in FIG. 3, which runs the complete longitudinal and latitudinal length of the bed frame 52.

Upon the bed surface 60 may exist any number of moveable objects 62. The self-powered lifting bed 10 is anticipated to have a capacity for moveable objects 62 in the order of 1000–2000 pounds. A portable lifting bed 10 adapted to be attached to a self-powered vehicle by a trailer hitch is anticipated to have a capacity for moveable objects 62 of approximately 6000 pounds.

Figure 3:
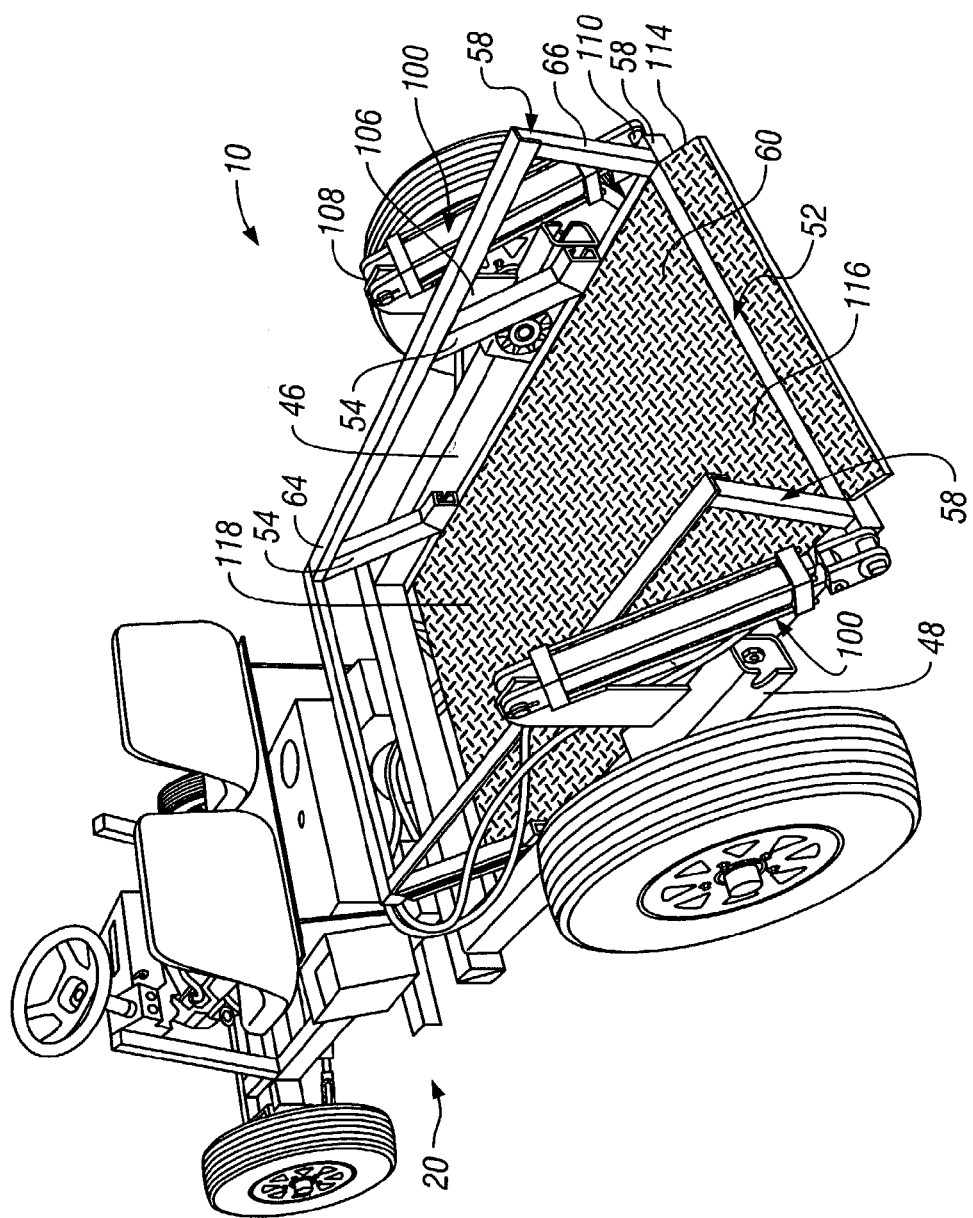
FIG. 3 is a rear perspective view of the portable lifting bed attached to a self-powered vehicle, the moveable bed trailer in the raised position.
Figure 4:
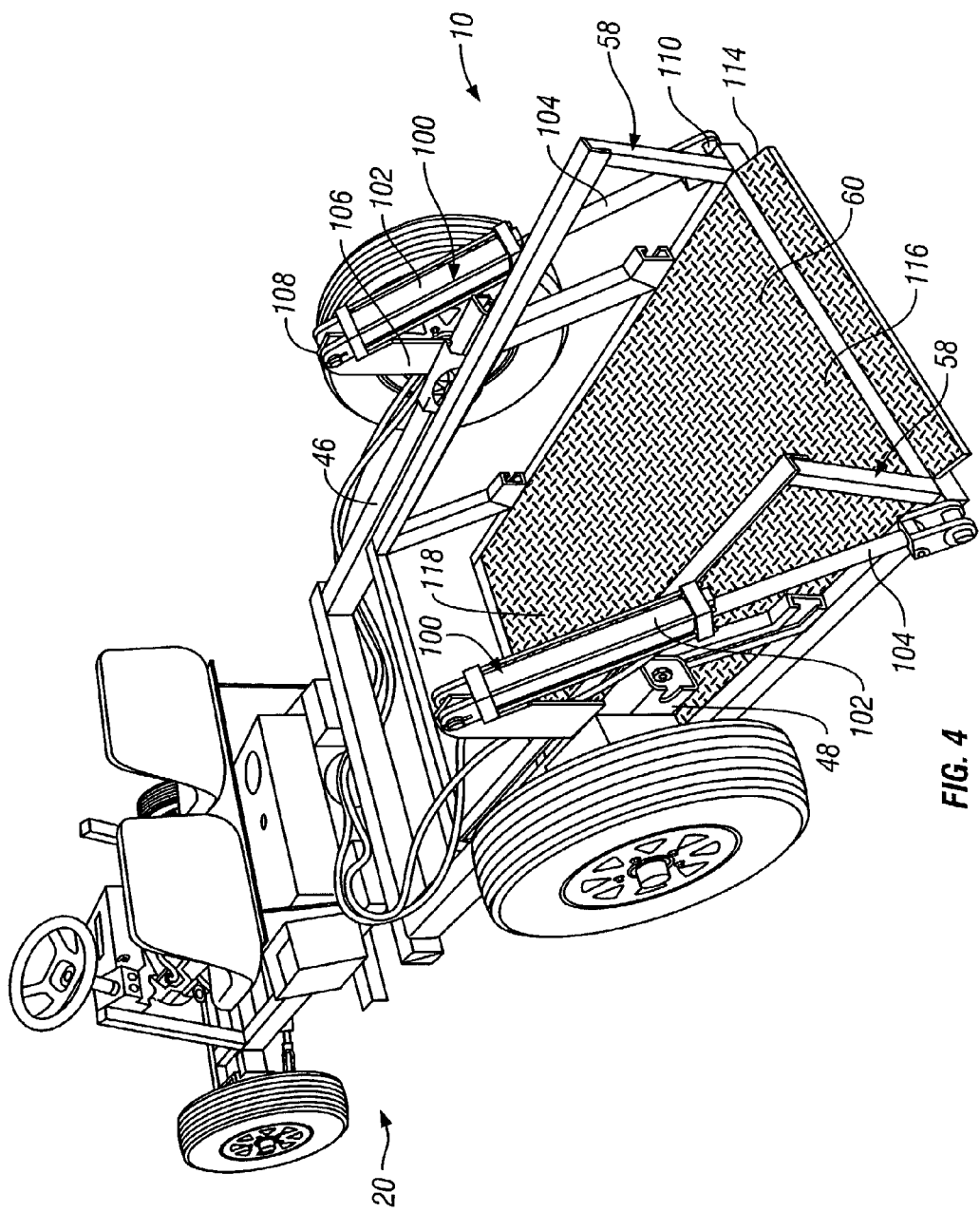
FIG. 4 is a rear perspective view of the portable lifting bed attached to a self-powered vehicle in the lower position.

As seen in FIG. 3 and FIG. 4, the moveable objects 62 are easily slid upon the bed 52 when the bed frame 52 is in a lower position. To aid upon sliding the moveable objects upon the bed surface 60, there may be positioned a ramp 114.

The moveable bed frame 52 has a railing 64. The railing is held in place by a railing support 66 and the diagonal guides 54.

As seen in FIG. 2, the diagonal guide 54 has a guide track 70. The guide track 70 has a lower end 72 and an upper end 74. The lower end 72 is approximately parallel to the longitudinal frame member 58 and attached thereto. The lower end 72 runs horizontal for a distance sufficient to accommodate a roller assembly 80. The roller assembly, as can be seen in FIG. 2A, is made up of a roller 82 and spindle 84.

The guide track 70 defines a roller assembly guide opening or channel 90. The guide opening 90 extends the length of the first end 72, the length of the angle member 70, and the length of the second end 74. The roller assembly 80 travels along the roller assembly guide opening 90 for moving the bed frame 52 from an upper position (FIG. 3) to a lower position (FIG. 4). When the bed frame 52 is in the upper position, the roller assembly 80 supports the weight of the bed frame 52 with assistance from actuators 100. Illustrated in FIG. 3 are actuators 100 holding the bed in an upper position. FIG. 4 is an illustration of the actuators extending the bed to a lower position.

The actuators 100 have cylinder 102 and rod 104. The cylinder 102 has an upper end 108 attached to the longitudinal frame member 46 of base frame 40 by an upstanding frame member 106 that is fixed to base frame 40. The actuators 100 have a lower end 110 attached to the longitudinal frame member 46 at a point beyond the roller assembly 80.

Figure 5:
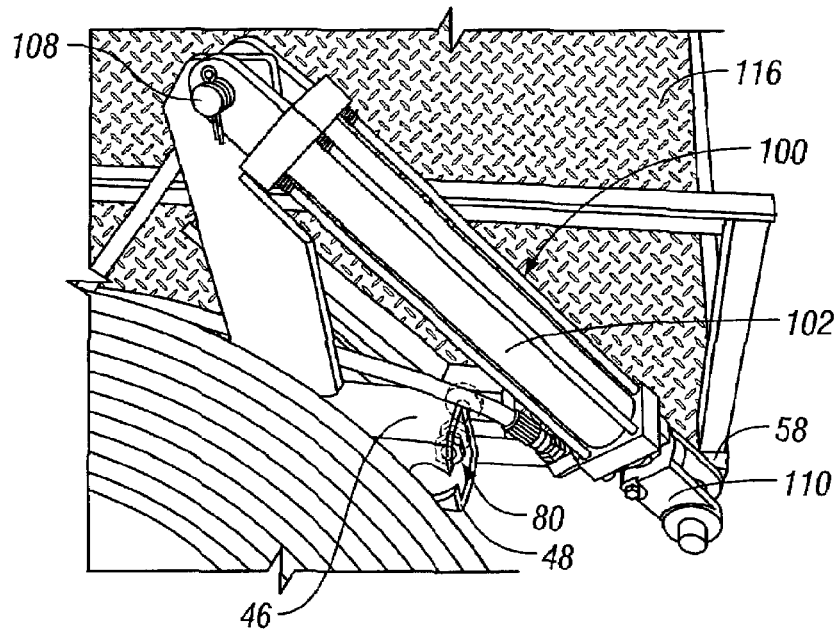
FIG. 5 is an enlarged view of the diagonal guide and actuator in a raised position.
Figure 6:
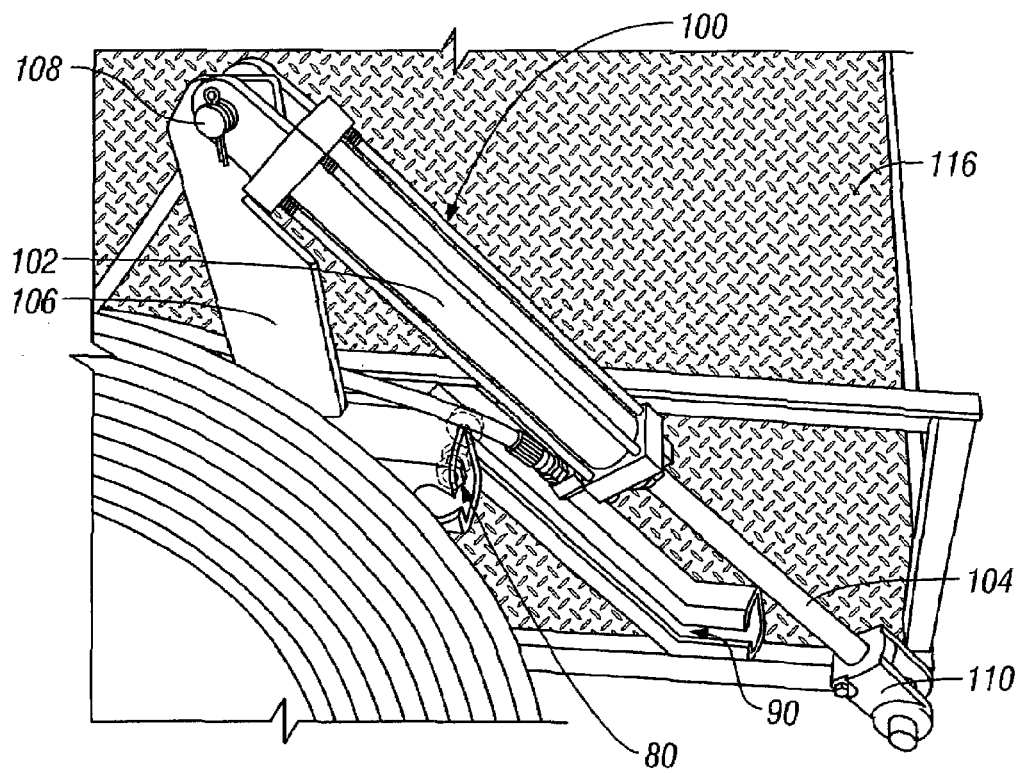
FIG. 6 is an enlarged view of the diagonal guide and actuator in a lower position.

An enlarged view of the operation of the actuators 100 in use may be seen in FIGS. 5 and 6.

In the preferred embodiment, the actuators 100 are hydraulic cylinders. They are connected by hydraulic lines to a hydraulic master cylinder 26 on the self-powered vehicle 20.

In use, the portable lifting bed 10 may be mounted on either a self-powered vehicle or as a trailer attached to a vehicle.

As seen in FIG. 3, the actuators 100 are retracted to hold the bed in an upper position during transportation. When the portable lifting bed 10 is held in the upper position, the roller 82 is in the lower end 72 of guide track 70. In this position, the roller assembly 80 exerts a force against the angle member first end 72 to prevent weight of lift bed frame 52 from being applied to the actuators 100. Additionally, safety features may be added to further prevent the bed frame 52 from moving from the upper position to the lower position.

When the user desires to lower the bed, the user manipulates the hydraulic system 26 to lower the bed frame 52 to the ground as seen in FIG. 4.

When the bed frame 52 is upon the ground, the rods 104 are in an extended state. During movement, the rods 104 move at an angle such that the longitudinal axes of actuators 100 are is approximately parallel to the longitudinal axes of guide tracks 70. In this approximately parallel orientation, the guide tracks 70 move approximately the same distance as the extension of the rod 104 outside the cylinder 102. To accommodate for slight deviation from parallel orientation, the actuators 100 may be pivotally mounted to the bed frame 52 and the base frame 54. Alternatively, the guide tracks 70 may be pivotally mounted to the bed frame 52 and the base frame 54.

When the rods 104 are extended at a point to which the bed is lowered to the ground, the roller assembly 80 is within the angle member upper end 74.

With the bed frame 52 in the lower position, the user is free to insert cargo 62 upon the bed. To aid in placement of the cargo 62 upon the bed frame 52, a ramp 114, as seen in FIGS. 3 and 4, may be attached to the bed.

Once the user has completely loaded the bed with cargo 62, the user is free to manipulate the hydraulic system 26, which lifts the bed frame 52 from a lower position forcing the angle member upper end 74 of guide track 70 to travel along the roller assembly 80, until the lower end 72 comes to rest with the roller assembly 80 supporting the lower end 72.

The user with the bed frame 52 in the upper position can then transport the cargo 62.

A dump system (not shown) comprising a pivot axis at the rear thereof may be used to enable the user to elevate the front end 118 of the bed frame 52 and to drop the back end 116. A hydraulic cylinder may be used to elevate front end 118 to enable a user to dump the contents of the bed frame 52 out. This dump system can be integral with the bed 118 or a separate dump system may be inserted on top of bed 118.

Thus a user would be able to load contents on the bed while it is in a lowered horizontal position and then lift the bed to an elevated horizontal position. The contents could then be dumped by elevating the front of bed 118 with the aforementioned cylinder.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest of render expedient without departing from the spirit or scope of the invention as further defined in the following claims.

What is claimed is:

1. A portable lifting bed adapted to be supported on a supporting surface comprising:
   a base frame supported on the supporting surface;
   a bed frame having an upwardly presented bed surface;
   at least two diagonal mounting mechanisms, each rigidly connected to the bed frame, and wherein the diagonal mounting mechanisms are adapted for guiding the bed frame for movement from an elevated position wherein the bed fame is closely adjacent the base frame to a lowered position wherein the bed frame is closely adjacent the supporting surface;
   a diagonal longitudinally extensible actuator having a first end pivotally connected to the base frame and a second end pivotally connected to the bed frame, the longitudinally extensible actuator being capable of moving the bed frame between the elevated and lowered positions;
   wherein the longitudinally extensible actuator includes a longitudinal actuator axis and at least two mounting mechanisms each include a longitudinal mounting mechanism axis, the actuator axis and the two mounting mechanism axes being approximately parallel to one another throughout movement of the bed frame between the elevated and lowered positions;
   wherein the longitudinally extensible actuator comprises a cylinder and rod assembly;
   a track follower associated with each of the at least two diagonal mounting mechanisms and connected to the base frame;
   wherein the at least two mounting mechanisms each comprise an elongated guide track such that the track follower associated with each of the mounting mechanisms is guided in the guide track and movable along the length thereof, the guide track connected to the bed frame;
   wherein the track follower comprises a roller;
   wherein the base frame is adapted to accommodate a tow bar; and
   wherein the longitudinally extensible actuator is operatively connected to a hydraulic output.

2. A portable lifting bed supported on a supporting surface and comprising:
   a base frame supported on the supporting surface;
   a bed frame having an upwardly presented bed surface;
   a track follower attached to the base frame;
   an elongated guide track having a diagonal portion and a horizontal portion, a guide opening along the length of the guide track permitting movement of the track follower,
   the guide track rigidly connected to the bed frame, the diagonal portion guiding the bed frame from a lowered position to an elevated position relative to the base frame, the horizontal portion supporting the bed frame in an elevated position;
   an actuator diagonally positioned between the bed frame and the base frame, the actuator being pivotally connected to both the bed frame and the base frame;
   wherein the actuator is a hydraulic cylinder;
   wherein the bed frame is maintained approximately parallel the base frame by the elongated guide mechanism during movement of the bed frame between a lowered position and an elevated position; and
   wherein the track follower is a roller.

* * * * *